W. DE SVESHNIKOFF.
METHOD OF RECOVERING WASTE NITRIC FUMES.
APPLICATION FILED JAN. 27, 1921.
1,406,353.  Patented Feb. 14, 1922.
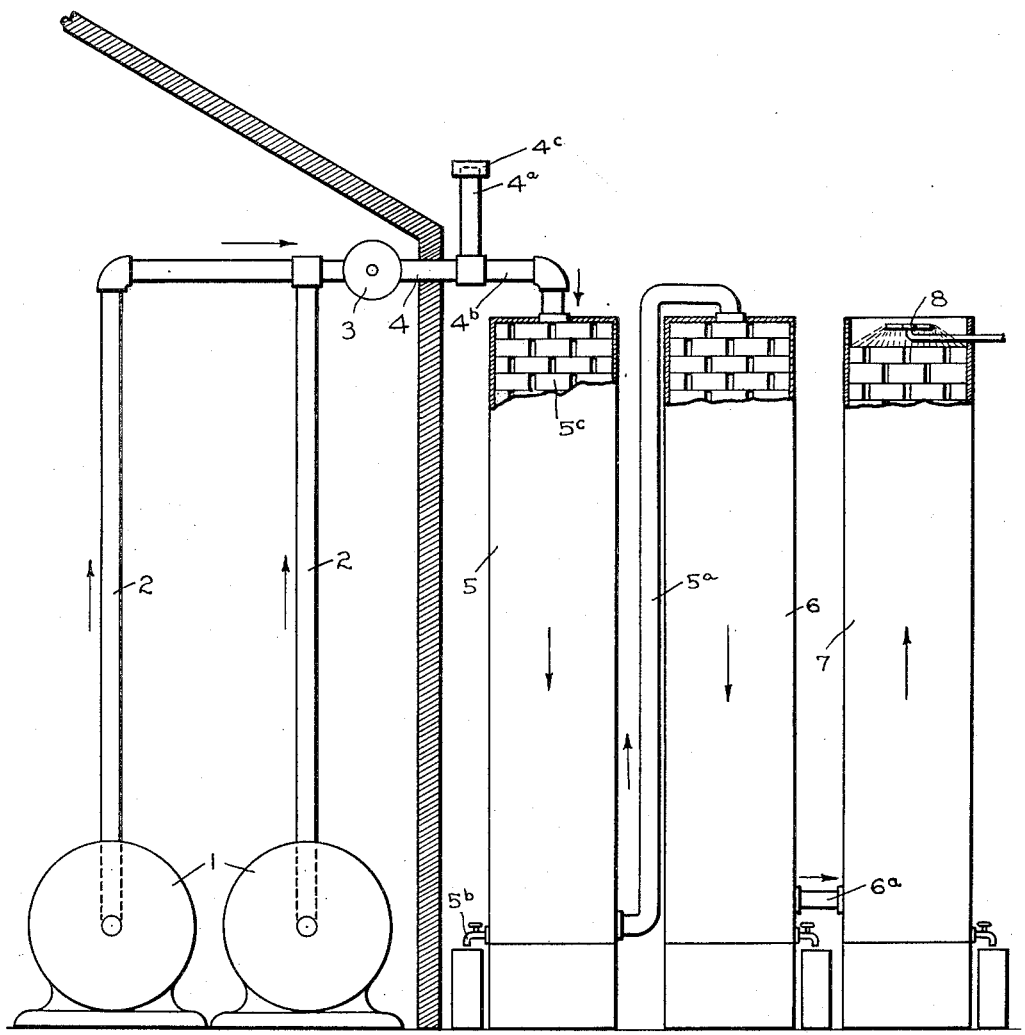

UNITED STATES PATENT OFFICE.

WOLDEMAR DE SVESHNIKOFF, OF WASHINGTON, DISTRICT OF COLUMBIA.

METHOD OF RECOVERING WASTE NITRIC FUMES.

1,406,353.   Specification of Letters Patent.   Patented Feb. 14, 1922.

Application filed January 27, 1921. Serial No. 440,362.

*To all whom it may concern:*

Be it known that I, WOLDEMAR DE SVESHNIKOFF, a citizen of Russia, residing at Washington, in the District of Columbia, have invented certain new and useful Improvements in Methods of Recovering Waste Nitric Fumes; and I hereby declare that the following is a full, clear, and exact description thereof, reference being had to the accompanying drawings, which form part of this specification.

Where nitric acid is employed in the manufacture of gun cotton, artificial leather, silk, or other related products, it is now customary to discharge the nitric acid fumes from the treating chambers or nitrating apparatus into the atmosphere, because there is at present no practical means for recovering the waste nitric acid in the fumes so economically, or at such a low cost of operation, as to make the recovery of such gases commercially feasible.

It is the object of my present invention to recover nitric acid from such waste fumes by a method so simple and so economical in operation that it can be employed where quantities of material are treated with nitric acid to recover the nitric acid from the fumes so cheaply as to be both practically and commercially desirable.

Ordinarily the fumes are withdrawn from the apparatus wherein the nitration is effected by means of a suction fan and directed into a duct through which they are conducted to a point of discharge.

In carrying out my invention instead of discharging the acid fumes into the open, these fumes are preferably conducted from the said discharge duct into the upper part of a condensing chamber or tower wherein the fumes are condensed by the cooling caused by their expansion upon entering the tower and by their contact with a large amount of chilling surfaces. The said chamber or tower may be of any suitable construction, but is preferably formed of or lined inside with ceramics, fire brick, pottery or other similar substance which is not affected by nitric acid; and such chamber or tower is also preferably filled internally with broken pottery, ceramics, fire brick or checker work of suitable acid proof material in such manner as to present a very large amount of cooling surface on which the fumes are condensed and precipitated.

This tower is preferably closed at the top and the nitric fumes introduced therein must, and naturally would, descend by gravity through the checker work or coarse aggregate therein; and as the expanded cooled fumes pass downward therein the nitric acid is precipitated or condensed upon the cool surfaces of the material in the tower, and collects thereon and gradually drips to the bottom of the tower, where it collects in undiluted condition and may be drawn off by suitable means into suitable receptacles or containers for the acid.

The fumes are largely, if not wholly condensed in the first tower.

The acid precipitated in the first chamber or tower may contain more or less of other precipitates carried over with the fumes but the acid would otherwise be of full strength and ready for reuse in the nitrating apparatus. The gases precipitated in the final tower would be greatly diluted by the water, and would have to be condensed before being reused. Any fumes which might escape condensation in undiluted condition might be collected in the final tower by means of a water spray at the open top of this tower, the water having a chemical affinity for nitric acid fumes; therefore all the acid fumes will be combined with the water and precipitated in the last tower the residual diluted acid being collected at the bottom of this tower. If desired the fumes may be introduced into the lower end of the last tower from the lower end of the previous tower.

The chambers or towers should be of such size and interior cubical capacity and so filled with checker work, etc., as to provide practically sufficient condensing surface to ensure precipitation of all the acid fumes which are generated in the nitrating apparatus. If the fumes from a plurality of nitrating apparatus were discharged into one set of chambers or towers they should be properly proportioned to take care of the total fume output of the plurality of nitrating apparatus.

In the accompanying drawing I have diagrammatically illustrated one arrangement of apparatus in accordance with the invention.

In said drawing the nitrating chambers or apparatus 1, may be of any suitable construction and from them the fumes may be drawn as usual through the ducts 2 by a fan 3, and could discharge through a duct 4 and pipe 4ᵃ into the atmosphere.

When the present invention is used the pipe 4ᵃ may be closed by a removable cap 4ᶜ and the fumes are conducted from the duct 4 through a duct 4ᵇ into the upper end of an exterior chamber or tower 5, which may be filled with acid resisting checker work or coarse aggregate 5ᶜ of any suitable material so as to insure the precipitation of the acid fumes by presenting a large extent of chilling surface thereto. The acid precipitated in this tower or chamber may be drawn off at 5ᵇ into any suitable receptacle.

Preferably after passing through the first tower 5 any uncondensed fumes may be directed by a duct 5ᵃ into the upper end of a second similar tower 6 through which they descend.

The greatest proportion or all of the acid fumes will be precipitated in the first tower 5. If any acid fumes enter the second tower 6 they should be precipitated therein.

If desired from the second tower the gases may be directed by a duct 6ᵃ into a final similar tower 7 wherein the residual acid fumes can be hydrated by means of water preferably supplied by a whirling spray head 8 of well known construction.

With a suitably constructed apparatus the amount of acid recovered should be about one kilo of acid for every thirty kilos of nitric acid used in the treatment of the material.

The number of towers used, their size, etc., would also depend upon the quantity of nitric acid used in the nitrating apparatus. It is obvious that no mechanism is required in the operation of this fume recovering apparatus, and the condensing towers and checker work when made of suitable acid resisting material will last for years before requiring repairs.

I claim:

1. The herein described method of recovering nitric acid from fumes given off in nitrating cotton and the like in the manufacture of gun powder and other products; consisting in directing the fumes withdrawn from the nitrating apparatus into and through a tower containing acid resisting material presenting a large extent of condensing surface to the fumes, the acid fumes being precipitated in the tower by the expansion of the fumes upon entering the tower and by condensation thereof upon the chilling surfaces in the tower without hydrating same, substantially as described.

2. In a method as set forth in claim 1, finally passing the residual fumes through a tower wherein they are hydrated, substantially as described.

In testimony that I claim the foregoing as my own, I affix my signature.

WOLDEMAR DE SVESHNIKOFF.